United States Patent
Li et al.

(10) Patent No.: US 11,895,430 B2
(45) Date of Patent: Feb. 6, 2024

(54) DRIVE CONTROL SYSTEM, CONTROL METHOD AND COMPUTER READABLE STORAGE MEDIUM

(71) Applicant: BOE Technology Group Co., Ltd., Beijing (CN)

(72) Inventors: Weiguo Li, Beijing (CN); Zhusong Yi, Beijing (CN); Tianyue Zhao, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 400 days.

(21) Appl. No.: 17/288,733

(22) PCT Filed: May 26, 2020

(86) PCT No.: PCT/CN2020/092439
§ 371 (c)(1),
(2) Date: Apr. 26, 2021

(87) PCT Pub. No.: WO2020/248815
PCT Pub. Date: Dec. 17, 2020

(65) Prior Publication Data
US 2021/0400228 A1    Dec. 23, 2021

(30) Foreign Application Priority Data
Jun. 10, 2019   (CN) .......................... 201910496665.9

(51) Int. Cl.
*H04N 7/015*         (2006.01)
*H04N 11/24*         (2006.01)
(Continued)

(52) U.S. Cl.
CPC ......... *H04N 5/44504* (2013.01); *G09G 5/003* (2013.01); *G09G 5/026* (2013.01);
(Continued)

(58) Field of Classification Search
CPC .... H04N 5/44504; H04N 11/24; H04N 7/015; G09G 5/003; G09G 5/026; G09G 2340/04; G09G 2340/125; G09G 2354/00
See application file for complete search history.

(56) References Cited

U.S. PATENT DOCUMENTS

2006/0132657 A1*   6/2006   Lee ..................... H04N 21/485
                                                         348/625
2006/0171670 A1    8/2006   Doi
(Continued)

FOREIGN PATENT DOCUMENTS

CN    101150682 A   3/2008
CN    102202195 A   9/2011
(Continued)

OTHER PUBLICATIONS

Optimum Effect for OSD Display in Case of TV Broadcasting Motion Video Screen.
CN201910496665.9 First Office Action.

*Primary Examiner* — Thai Q Tran
*Assistant Examiner* — Jose M Mesa
(74) *Attorney, Agent, or Firm* — IPro, PLLC

(57) ABSTRACT

A drive control system, a control method and a computer-readable storage medium, wherein the drive control system comprises: a system on chip, configured to receive video data and user operation instructions; a video data processor, electrically connected with the system on chip and configured to receive the video data and perform enhancement processing on the video data; an on-screen display data processor, electrically connected with the system on chip and configured to receive the user operation instructions and process the user operation instructions into corresponding on-screen display data; and a display drive circuit, electrically connected with the video data processor and the on-screen display data processor respectively and config-
(Continued)

ured to receive video data subjected to enhancement processing and the on-screen display data and fuse the video data subjected to enhancement processing with the on-screen display data to drive a display panel for display according to fused data.

17 Claims, 5 Drawing Sheets

(51) Int. Cl.
    *H04N 5/445*     (2011.01)
    *G09G 5/00*     (2006.01)
    *G09G 5/02*     (2006.01)

(52) U.S. Cl.
    CPC ............ *H04N 7/015* (2013.01); *H04N 11/24* (2019.01); *G09G 2340/04* (2013.01); *G09G 2340/125* (2013.01); *G09G 2354/00* (2013.01)

(56) References Cited

U.S. PATENT DOCUMENTS

| | | | |
|---|---|---|---|
| 2007/0056009 A1* | 3/2007 | Spilo | G09G 5/006 |
| | | | 725/132 |
| 2011/0234908 A1 | 9/2011 | Hsu et al. | |
| 2014/0362295 A1* | 12/2014 | Suzuki | H04N 21/47 |
| | | | 348/564 |

FOREIGN PATENT DOCUMENTS

| | | |
|---|---|---|
| CN | 102780899 A | 11/2012 |
| CN | 203313319 U | 11/2013 |
| CN | 107197356 A | 9/2017 |
| CN | 109275011 A | 1/2019 |
| EP | 3240284 A1 | 11/2017 |

* cited by examiner

| BO | Fl  | VR        |
|----|-----|-----------|
| 0  | 1/0 | 1280*720  |
| 1  | 1/0 | 1440*1080 |
| 2  | 1/0 | 1920*1080 |
| 3  | 1/0 | 2560*1440 |
| 4  | 1/0 | 3840*2160 |
| 5  | 1/0 | 5120*2880 |
| 6  | 1/0 | 7680*4320 |
| 7  | 1/0 | 10240*4320|

FIG. 5A

| BO | Fl | FS   |
|----|----|------|
| 0  | 1  | fs-1 |
| 1  | 0  | fs-2 |
| 2  | 0  | fs-3 |
| 3  | 0  | fs-4 |
| 4  | 0  | fs-5 |
| 5  | 0  | fs-6 |
| 6  | 0  | fs-7 |
| 7  | 0  | fs-8 |

FIG. 5B

| BO | Fl | SS   |
|----|----|------|
| 0  | 1  | ss-1 |
| 1  | 0  | ss-2 |
| 2  | 0  | ss-3 |
| 3  | 0  | ss-4 |
| 4  | 0  | ss-5 |
| 5  | 0  | ss-6 |
| 6  | 0  | ss-7 |
| 7  | 0  | ss-8 |

FIG. 5C

| BO | Fl | A.R |
|---|---|---|
| 0 | 1/0 | 4 by 3 |
| 1 | 1/0 | 14 by 9 |
| 2 | 1/0 | 16 by 9 |
| 3 | 1/0 | 21 by 9 |
| 4 | 1/0 | 21 by 10 |
| 5 | 1/0 | 22 by 10 |
| 6 | 1/0 | Reserved |
| 7 | 1/0 | Reserved |

FIG. 5D

DRIVE CONTROL SYSTEM, CONTROL METHOD AND COMPUTER READABLE STORAGE MEDIUM

CROSS REFERENCE TO RELATED APPLICATIONS

The present application is a national phase entry under 35 U.S.C. § 371 of International Application No. PCT/CN2020/092439, filed on May 26, 2020, which claims priority to Chinese Patent Application No. 201910496665.9, filed to the China Patent Office on Jun. 10, 2019 and entitled "Drive Control System, Control Method and Computer-Readable Storage Medium", the entire contents of which are incorporated herein by reference.

FIELD

The present disclosure relates to the technical field of data transmission, in particular to a drive control system, a control method and a computer-readable storage medium.

BACKGROUND

With the rapid development of the display technology, the resolution of display panels is increasingly higher to meet the viewing needs of users, e.g., Full High Definition (FHD) and 4K (Ultra High Definition).

SUMMARY

An embodiment of the present disclosure provides a drive control system, including:
  a system on chip, configured to receive video data and user operation instructions;
  a video data processor, electrically connected with the system on chip and configured to receive the video data sent by the system on chip and perform enhancement processing on the video data;
  an on-screen display data processor, electrically connected with the system on chip and configured to receive the user operation instructions sent by the system on chip and process the user operation instructions into corresponding on-screen display data; and
  a display drive circuit, electrically connected with the video data processor and the on-screen display data processor respectively and configured to receive video data subjected to enhancement processing sent by the video data processor and the on-screen display data and fuse the video data subjected to enhancement processing with the on-screen display data to drive a display panel for display according to fused data.

In some embodiments, in the embodiment of the present disclosure, the system on chip is further configured to:
  acquire a current resolution of the display panel and a current data architecture of an on-screen display data module in the on-screen display data processor;
  determine whether the current data architecture is matched with a data architecture of the on-screen display data module required by a current resolution or not; and
  send the data architecture of the on-screen display data module required by the current resolution to the on-screen display data processor, in response to determining that the current data architecture is not matched with the data architecture of the on-screen display data module required by the current resolution.

In some embodiments, in the embodiment of the present disclosure, the system on chip is further configured to store a plurality of preset data architectures of the on-screen display data module.

In some embodiments, in the embodiment of the present disclosure, the system on chip is further configured to:
  acquire a data architecture change instruction sent by a user; and
  generate and store a customized data architecture of the on-screen display data module according to the data architecture change instruction.

In some embodiments, in the embodiment of the present disclosure, the data architecture includes structural parameters of a graphical user interface displayed on the display panel.

In some embodiments, in the embodiment of the present disclosure, the system on chip includes a first system on chip and at least one second system on chip;
  the first system on chip is configured to receive the user operation instructions; and
  the first system on chip and each second system on chip are configured to receive the video data respectively.

In some embodiments, in the embodiment of the present disclosure, the drive control system further includes:
  a bypass signal receiving circuit, electrically connected with the video data processor and configured to receive a bypass video signal and send the bypass video signal to the video data processor;
  the video data processor is further configured to receive the bypass video signal and perform enhancement processing on the bypass video signal; and
  the display drive circuit is further configured to receive bypass video data subjected to enhancement processing sent by the video data processor.

An embodiment of the present disclosure provides a control method of a drive control system, including:
  receiving, by a system on chip, video data and user operation instructions;
  sending, by the system on chip, the video data to a video data processor to trigger the video data processor to receive the video data and perform enhancement processing on the video data, and sending, by the system on chip, the user operation instructions to an on-screen display data processor to trigger the on-screen display data processor to receive the user operation instructions and process the user operation instructions into corresponding on-screen display data;
  receiving, by a display drive circuit, video data subjected to enhancement processing and the on-screen display data and fusing, by the display drive circuit, the video data subjected to enhancement processing with the on-screen display data; and
  driving, by the display drive circuit, a display panel for display according to fused data.

In some embodiments, in the embodiment of the present disclosure, before receiving, by the system on chip, the video data and the user operation instructions, the control method further includes:
  acquiring, by the system on chip, a current resolution of the display panel and a current data architecture of an on-screen display data module in the on-screen display data processor;
  determining whether the current data architecture is matched with a data architecture of the on-screen display data module required by a current resolution or not; and sending the data architecture of the on-screen display data module required by the current resolution to the on-screen display data processor, in response to determining that the current data architecture is not matched with the data architecture of the on-screen display data module required by the current resolution.

In some embodiments, in the embodiment of the present disclosure, before receiving, by the system on chip, the video data and the user operation instructions, the control method further includes:

storing a plurality of preset data architectures of the on-screen display data module.

In some embodiments, in the embodiment of the present disclosure, before receiving, by the system on chip, the video data and the user operation instructions, the control method further includes:

acquiring a data architecture change instruction sent by a user; and generating and storing a customized data architecture of the on-screen display data module according to the data architecture change instruction.

A computer-readable storage medium according to some embodiments of the present disclosure has a computer program stored thereon, and when the program is executed by a processor, the steps of a control method of a drive control system described above are implemented.

BRIEF DESCRIPTION OF THE DRAWINGS

FIG. 5A is a schematic diagram of some display image resolution parameter values according to some embodiments of the present disclosure.

FIG. 5B is a schematic diagram of some display image font type parameter values according to some embodiments of the present disclosure.

FIG. 5C is a schematic diagram of some display image font size parameter values according to some embodiments of the present disclosure.

FIG. 5D is a schematic diagram of some drawing capability parameter values according to some embodiments of the present disclosure.

DETAILED DESCRIPTION OF THE EMBODIMENTS

Figure 1:
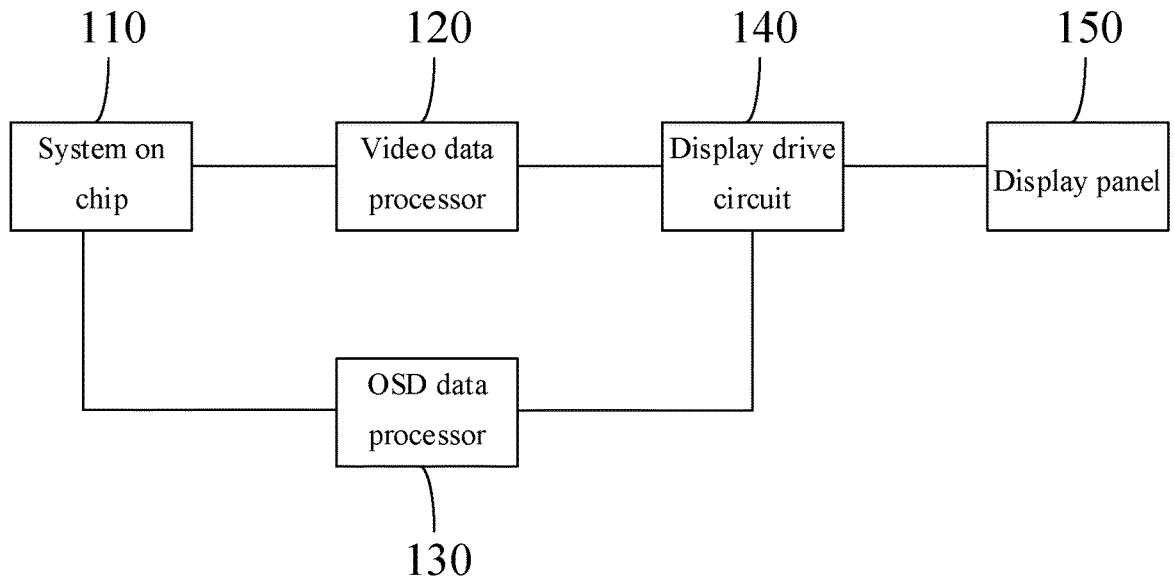
FIG. 1 is a schematic structural diagram of a drive control system according to some embodiment of the present disclosure.

In order to make the objectives, technical solutions and advantages of the embodiments of the present disclosure clearer, the technical solutions of the embodiments of the present disclosure will be described clearly and completely as follows in conjunction with the accompanying drawings of the embodiments of the present disclosure. Apparently, the described embodiments are part of the embodiments of the present disclosure, rather than all of the embodiments. In the case of no conflict, the embodiments in the present disclosure and the features in the embodiments may be combined with each other. Based on the described embodiments of the present disclosure, all other embodiments obtained by those of ordinary skill in the art without creative labor are within the protection scope of the present disclosure.

Unless otherwise defined, the technical terms or scientific terms used herein shall be the ordinary meanings understood by those with ordinary skills in the art to which the present disclosure belongs. "First", "second" and similar words used in the present disclosure do not indicate any order, quantity or importance, but are only used to distinguish different components. "Include" or "comprise" and other similar words mean that an element or item appearing before the words covers elements or items listed after the words and their equivalents, but does not exclude other elements or items. "Connection" or "connected" and other similar words are not limited to physical or mechanical connections, but may include electrical connections, whether direct or indirect.

It should be noted that the size and shape of each figure in the drawings do not reflect the true scale, and are only intended to illustrate the content of the present disclosure. In addition, the same or similar reference numerals indicate the same or similar elements or elements with the same or similar functions all the time.

Generally, for Full High Definition (FHD) and 4K (Ultra High Definition) TV display products, technical implementations of a display image are usually that a VIDEO signal and an On-Screen Display (OSD) signal are both processed by a System on Chip (SOC). After SOC processing, the processed signals are mixed into one path of signal and sent to a display drive circuit to drive a display Panel for display. In some solutions, in order to improve the display effect of the display image and/or match a scanning mechanism of the display Panel, video processing chips (for example a Field-Programmable Gate Array (FPGA) or a Video Scaler) may also be added after SOC processing is completed. However, video processing algorithms in these video processing chips often cannot distinguish data mixed from video data and OSD data, and some algorithms used in specific video scenes cannot handle well or even negatively affect OSD data of computer-generated graphics.

In addition, for 8K or even higher resolution video signals, one SOC often cannot complete decoding, and a plurality of SOCs are required to simultaneously cooperate to complete decoding and processing. If the plurality of SOCs cooperate to complete decoding and processing, a control mechanism will be complicated. If one of the SOCs is required to complete decoding and processing, a heavy load will be caused.

In addition, for video signals bypassed from the FPGA and the Video Scaler, the FPGA and the Video Scaler are relatively weak in generation and processing of OSD data, which leads to poor processing of the OSD data, resulting in different styles of user interfaces displayed on a corresponding whole computer and reduced user experience.

In view of this, the embodiments of the present disclosure provide a drive control system, as shown in FIG. 1, including:

a system on chip 110, configured to receive video data and user operation instructions;

a video data processor 120, electrically connected with the system on chip 110 and configured to receive video data sent by the system on chip 110 and perform enhancement processing on the received video data;

an OSD data processor 130, electrically connected with the system on chip 110 and configured to receive user operation instructions sent by the system on chip 110 and process the received user operation instructions into corresponding OSD data; and a display drive circuit 140, electrically connected with the video data processor 120 and the OSD data processor 130 respectively and configured to receive the video data subjected to enhancement processing sent by the video data processor 120 and the on-screen display data and fuse the received video data subjected to enhancement processing with the on-screen display data to drive a display panel 150 for display according to fused data.

According to the drive control systems provided by the embodiments of the present disclosure, the video data sent by the system on chip is subjected to enhancement processing through the video data processor, and the user operation instructions sent by the system on chip are processed through the OSD data processor to generate the corresponding OSD data, so that the video data and the OSD data may be processed separately, the two kinds of data are fused before display through the display drive circuit, and then the display panel is driven to display. In this way, problems of poor display image quality caused by mixed processing of the video data and the OSD data and reduced user experience may be solved. Therefore, the drive control systems provided by the embodiments of the present disclosure may improve display image quality and improve user experience.

In some embodiments, in the embodiments of the present disclosure, the system on chip is further configured to:

acquire a current resolution of the display panel and a current data architecture of an on-screen display data module in the on-screen display data processor;

determine whether the current data architecture is matched with a data architecture of the on-screen display data module required by a current resolution or not; and send the data architecture of the on-screen display data module required by the current resolution to the on-screen display data processor, in response to determining that the current data architecture is not matched with the data architecture of the on-screen display data module required by the current resolution.

In some embodiments, the data architecture may include structural parameters of a Graphical User Interface (GUI) displayed on the display panel. Exemplarily, the data architecture may be constituent elements describing the entire graphical user interface. The data architecture of the OSD data processor mainly describes constituent elements of the entire graphical user interface, where the constituent elements include an ID, an element type, a hierarchical relationship, text information, a relative position, a relative size, a text font, a text style, a text font size, a text color and the like. In addition, an entire architecture description table of an OSD data processing module is generated in a product design stage according to a technical document of the OSD data processing module and a developer guide. The OSD data architecture is issued by the system on chip to the OSD data processing module when a software system runs for the first time, and then during normal system operation, the system on chip only needs to issue user operation instructions and system messages. For example, when the display panel is a television, the user operation instructions may be user operation instructions for a user to adjust brightness and contrast of a display image, or adjust a played sound. In the embodiments of the present disclosure, the user operation instructions are not restricted, and may be all operation instructions made by the user through a relevant controller. In addition, in a case that the display panel is a mobile phone, the system messages may be messages generated internally to a system when there is an incoming call. As shown in Table 1, OSD data architecture elements are shown: UI_ID, Element_Type, Group, Level, Dimension, Position, Font, Font_Size, Font_Color, Font_Attribute, Caption and Helpline.

TABLE 1

| |
| --- |
| UI_ID |
| Element_Type |
| Group |
| Level |
| Dimension |
| Position |
| Font |
| Font_Size |
| Font_Color |
| Font_Attribute |
| Caption |
| Helpline |

In some embodiments, in the embodiments of the present disclosure, the system on chip is further configured to store a plurality of preset data architectures of the on-screen display data module. In this way, the plurality of data architectures that may adapt to ordinary OSD data for display are stored in the system on chip through a way of pre-storage.

In some embodiments, in the embodiments of the present disclosure, the system on chip is further configured to acquire a data architecture change instruction sent by a user; and generate and store a customized data architecture of the on-screen display data module according to the data architecture change instruction. In this way, the data architecture can be determined according to user's own needs, so that the OSD data displayed on the display panel may be more in line with viewing habits of the user, and the user experience effect is further improved.

Figure 2:
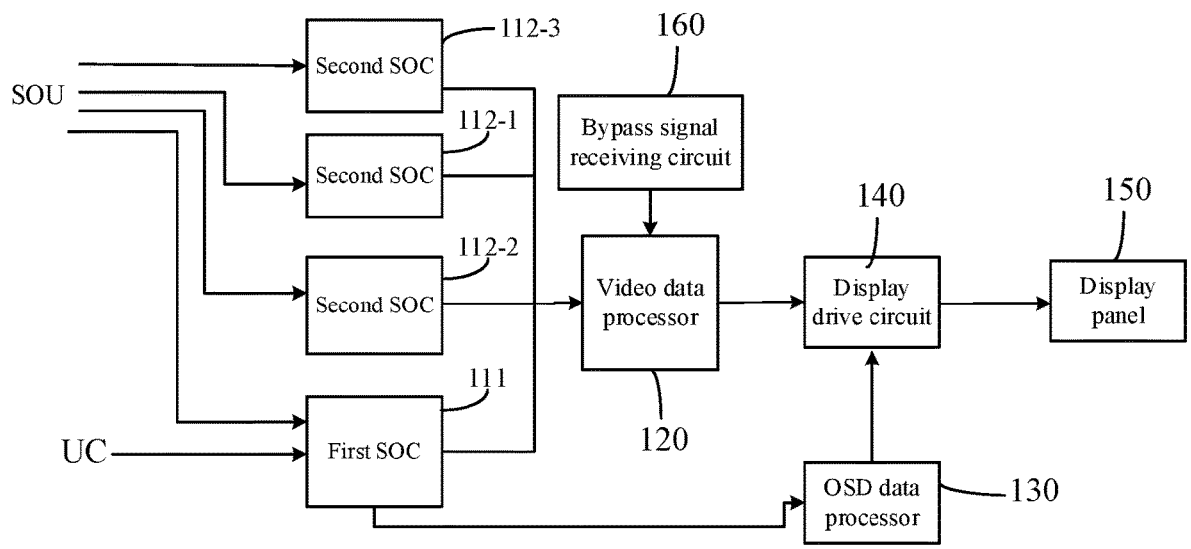
FIG. 2 is a specific schematic structural diagram of a drive control system according to some embodiments of the present disclosure.
Figure 3:
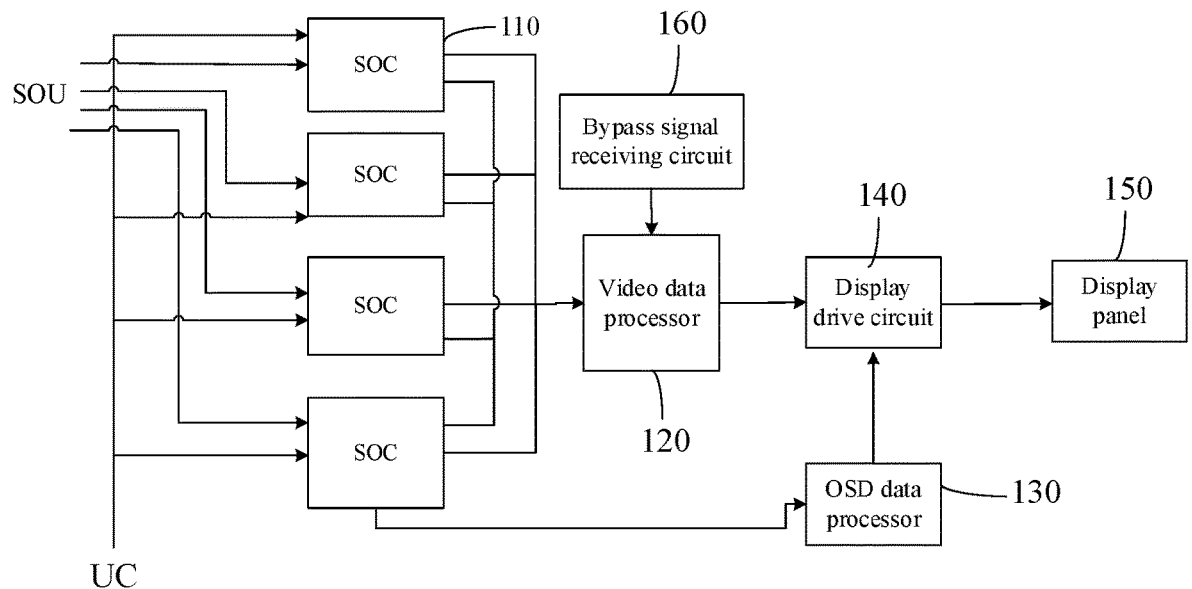
FIG. 3 is a specific schematic structural diagram of another drive control system according to some embodiments of the present disclosure.

In some embodiments, in the embodiments of the present disclosure, as shown in FIG. 2 and FIG. 3, there may be a plurality of systems on chips. Exemplarily, as shown in FIG. 2, each of the systems on chips includes a first system on chip and at least one second system on chip. The first system on chip is configured to receive the user operation instructions. The first system on chip and each of the second systems on chips are configured to receive the video data respectively. Exemplarily, each of the systems on chips includes the first system on chip 111 and three second systems on chips 112-1, 112-2 and 112-3. Of course, in practical applications, the number of the second systems on chips may also be 1, 2, 4, 6 or more, which is not limited here.

Exemplarily, as shown in FIG. 3, there may be the plurality of systems on chips. Each of the systems on chips is configured to receive the user operation instructions and receive the video data. In addition, each of the systems on chips sends the received user operation instructions to the OSD data processor 130, and sends the received video data to the video data processor 120. Of course, in practical applications, the number of the systems on chips may also be 2, 4, 6 or more, which is not limited here.

In some embodiments, in the embodiments of the present disclosure, as shown in FIG. 2 and FIG. 3, the drive control system may further include: a bypass signal receiving circuit 160 electrically connected with the video data processor 120. The bypass signal receiving circuit 160 is configured to receive a bypass video signal and send the received bypass video signal to the video data processor 120. In addition, the video data processor 120 is further configured to receive the bypass video signal and perform enhancement processing on the bypass video signal.

The display drive circuit is further configured to receive bypass video data subjected to enhancement processing sent by the video data processor.

The drive control system provided by the present disclosure will be introduced below in conjunction with FIG. 3.

A system on chip (SOC): achieving decoding and processing of the Video signal, signal source management, user operation instruction management and system message management.

Exemplarily, there may be the plurality of SOCs. One of the SOCs (for example the first SOC 111) is mainly responsible for receiving the user operation instructions and the video data, and then sending the user operation instructions to the OSD data processor 130, so that the OSD data processor 130 completes processing of the OSD data and actual generation of OSD interface data. In addition, the video data is sent to the video data processor 120. The remaining SOCs (for example the second SOCs 112-1, 112-2 and 112-3) are responsible for receiving the video data and sending the video data to the video data processor 120.

Exemplarily, there may also be one SOC. One SOC independently completes reception and management of the video data, and at the same time, the SOC is responsible for reception and management of the user operation instructions and then sends the user operation instructions to the OSD data processor 130, so that the OSD data processor 130 completes the processing of the OSD data and the actual generation of the OSD interface data. In addition, the video data is sent to the video data processor 120 to reduce its own load.

The video data processor 120 may be, for example, a Video Enhancer, a Video Scaler or an FPGA. The Video Enhancer is a dedicated video enhancement processing chip to achieve image enhancement in a specific scene. The embodiments of the present disclosure do not limit a specific implementation of the video data processor 120.

The bypass signal receiving circuit 160 may, for example, receive a video signal sent by an external device of the display panel. The external device may be a DVD player or other video signal sources, and the embodiments of the present disclosure do not limit a source of a bypass signal.

The on-screen display data processor 130 may be, for example, a Graphic Processing Unit (GPU). The GPU is electrically connected with each of the SOCs, the OSD data is generated according to the user operation instructions through the data architecture, and the OSD data carries Graphical User Interface (GUI) data and sends the GUI data to the display drive circuit 140.

The display drive circuit 140, for example, may be a Timer Controller (TCON), which respectively receives the Video data sent by the video data processor 120 and the OSD data sent by the on-screen display data processor 130, so that the Video data and the OSD data are fused right before final display, thereby avoiding negatively affecting the OSD data when enhancement processing is performed by a video data enhancement module.

The display panel 150, for example, may be a final display device connected with the display drive circuit 140, and the display drive circuit 140 drives the display device to display images. Exemplarily, the display device may be a television, a mobile phone and the like, which is not limited in the present disclosure.

Figure 4:
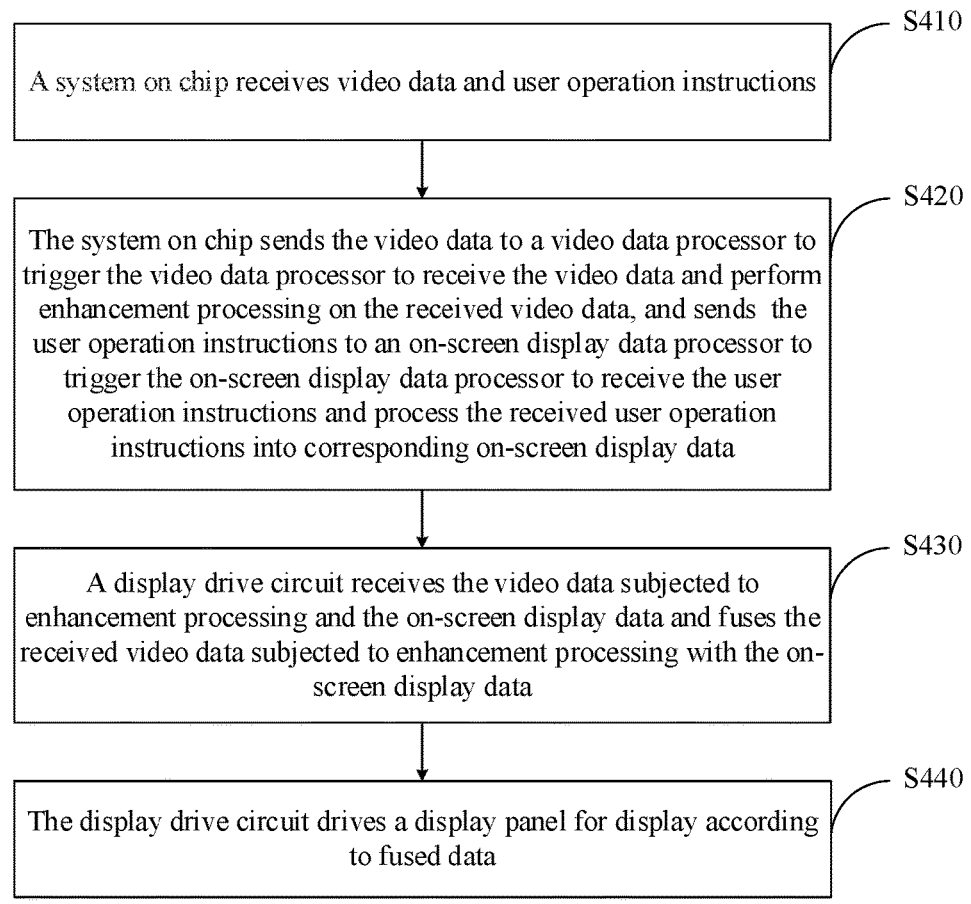
FIG. 4 is a schematic flowchart of a control method according to some embodiments of the present disclosure.

Based on the above-mentioned drive control system provided by the embodiment of the present disclosure, an embodiment of the present disclosure also provides a control method of a drive control system. As shown in FIG. 4, the implementation steps of the control method of the drive control system provided by the embodiment of the present disclosure are as follows.

S410, a system on chip receives video data and user operation instructions.

S420, the system on chip sends the video data to a video data processor to trigger the video data processor to receive the video data and perform enhancement processing on the received video data, and sends the user operation instructions to an on-screen display data processor to trigger the on-screen display data processor to receive the user operation instructions and process the received user operation instructions into corresponding on-screen display data.

S430, a display drive circuit receives the video data subjected to enhancement processing and the on-screen display data and fuses the received video data subjected to enhancement processing with the on-screen display data.

S440, the display drive circuit drives a display panel for display according to fused data.

In some embodiments, before the system on chip receives the video data and the user operation instructions, the control method further includes:

the system on chip acquires a current resolution of the display panel and a current data architecture of an on-screen display data module in the on-screen display data processor, determines whether the current data architecture is matched with a data architecture of the on-screen display data module required by a current resolution or not, and sends the data architecture of the on-screen display data module required by the current resolution to the on-screen display data processor, in response to determining that the current data architecture is not matched with the data architecture of the on-screen display data module required by the current resolution.

In some embodiments, before the system on chip receives the video data and the user operation instructions, the control method further includes: a plurality of preset data architectures of the on-screen display data module are stored.

In some embodiments, before the system on chip receives the video data and the user operation instructions, the control method further includes: a data architecture change instruction sent by a user is acquired; and a customized data architecture of the on-screen display data module is generated and stored according to the data architecture change instruction.

Figure 6:
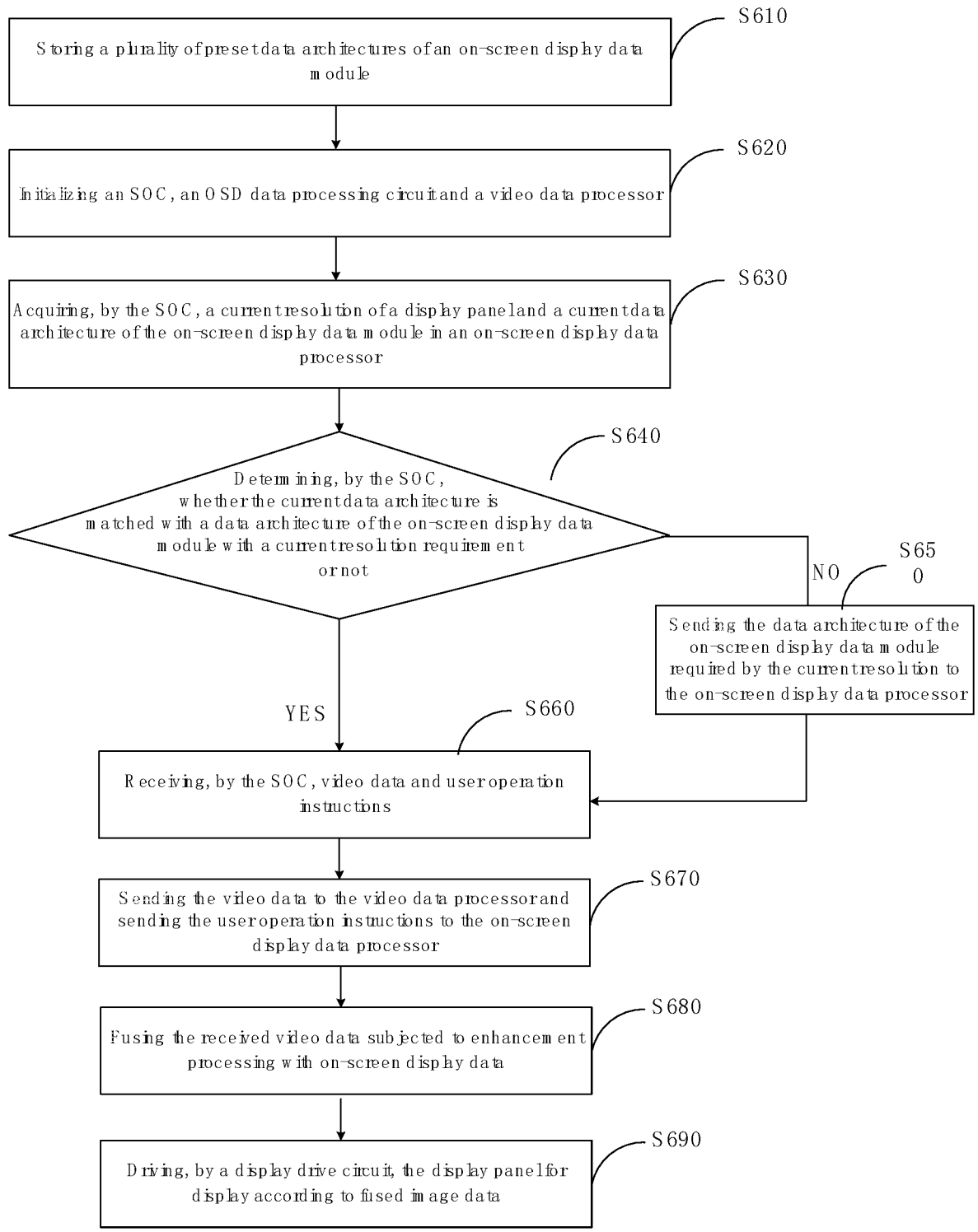
FIG. 6 is an overall implementation flowchart of a control method according to some embodiments of the present disclosure.

The control method provided by the embodiment of the present disclosure will be illustrated below in conjunction with FIG. 3 and FIG. 6. The control method provided by the embodiment of the present disclosure may include the following steps.

S610, each of the SOCs stores the plurality of preset data architectures of the on-screen display data module.

S620, when the drive control system is powered on to be ready to operate, the SOC 110, an OSD data processing circuit 130 and the video data processor 120 are initialized.

S630, after the initializations of the SOC 110, the OSD data processing circuit 130 and the video data processor 120 are completed, the SOC 110 acquires the current resolution of the display panel and the current data architecture of the on-screen display data module in the on-screen display data processor. In this way, a current data architecture version of the OSD data module currently stored in the OSD data processor may be queried. Therefore, capability of the OSD data processor to process OSD data in various aspects and some preset data processing parameters under the current data architecture version may be determined.

In some embodiments, one current data architecture version corresponds to one set of capability of the OSD data processor to process data in various aspects and some preset data processing parameters, and as shown in FIGS. 5A to 5D, parameters shown in the figures are part of the parameters of the capability to process data. As shown in FIG. 5A, VR represents a screen resolution, parameters in the table indicate different resolutions of a display image after data processing, BO represents the data architecture version, F1 represents a parameter (1 is a valid parameter and 0 is an invalid parameter), and different data architecture versions correspond to different resolutions. Therefore, by acquiring the current resolution of the display panel, a data architecture version of the OSD data module required by the display panel may be acquired. For example, if the current resolution is 2560*1440, the required data architecture version of the OSD data module corresponds to a version 3.

As shown in FIG. 5B, BO represents the data architecture version, F1 represents the parameter (1 is a valid parameter and 0 is an invalid parameter), and FS represents a font type. Parameter values (fs-1, fs-2, fs-3 . . . ) of FS in the figure are types of a font in the display image, that is to say, in which font the processed data is displayed when displayed on the display device may be preset based on the parameter values of FS in a table.

As shown in FIG. 5C, BO represents the data architecture version, F1 represents the parameter (1 is a valid parameter and 0 is an invalid parameter), and SS represents a font size of the display font. Parameter values (ss-1, ss-2, ss-3 . . . ) of SS in the figure represent different font sizes, and the parameter values are different in different data processing module versions.

As shown in FIG. 5D, BO represents the data architecture version, F1 represents the parameter (1 is a valid parameter and 0 is an invalid parameter), and A.R represents a mapping capability parameter value of the OSD data processor. In the embodiments of the present disclosure, there are many kinds of data processing capability parameters, which are not limited to the several data processing parameters listed above, and parameters that can reflect data processing capabilities and image display styles all belong to the data processing capability parameters.

S640, after the current data architecture version of the OSD data processing module is queried, the SOC determines whether the current data architecture is matched with the data architecture of the on-screen display data module required by the current resolution or not. In response to determining that the current data architecture is not matched with the data architecture of the on-screen display data module required by the current resolution, steps S650 to S690 are executed. In response to determining that the current data architecture is matched with the data architecture of the on-screen display data module required by the current resolution, steps S660 to S690 are executed.

S650, the data architecture of the on-screen display data module required by the current resolution is sent to the on-screen display data processor.

For example, the current resolution is 2560*1440, and the data architecture version corresponding to the required OSD data module corresponds to the version 3. However, the current data architecture version of the OSD data processing module corresponds to a version 2, indicating that the current data architecture is not matched with the data architecture of the on-screen display data module required by the current resolution. The SOC configures the OSD data processor with a data architecture that matches the current resolution.

Although the SOC and the OSD data processor 130 follow a unified protocol with respect to GUI implementation, there may be inconsistencies in version or pre-definition between the two, especially after a whole machine is operated for the first time after it leaves a factory or after one of the SOC and the OSD data processor performs software upgrading, version comparison and consistency processing are required to keep versions consistent between the two, so as to ensure that the two may communicate in accordance with the same protocol.

In addition, in the embodiments of the present disclosure, developers perform GUI design and development in accordance with one or several GUI presentation specifications and protocols, and only GUI logic and descriptive codes need to be maintained during product derivation or new product design. Formation of GUI graphical portions is uniformly achieved by the GPU, software developers do not need to repeatedly develop a user interface, and code reusability is high.

After the SOC configures the data architecture for the OSD data processing circuit 130, a preset OSD architecture scheme will be displayed. The scheme includes a resolution of a display image, a type, size, color and the like of a display font, and parameters that affect a display image style. Users may decide whether to use the preset scheme or not based on their own needs and preferences. If the users decide to use the preset scheme, the preset scheme is directly configured. If the users do not decide to use the preset scheme, a customized scheme is set based on needs of the users. The users may choose values of relevant parameters according to their own needs to meet a demand for the display image. After an OSD architecture is determined, the determined OSD architecture is configured.

S660, the SOC 110 receives video data SOU and user operation instructions UC.

S670, the SOC 110 sends the video data to the video data processor 120 to trigger the video data processor 120 to receive the video data and perform enhancement processing on the received video data, and sends the user operation instructions to the on-screen display data processor 130 to trigger the on-screen display data processor 130 to receive the user operation instructions and process the received user operation instructions into corresponding on-screen display data.

S680, the display drive circuit 140 receives the video data subjected to enhancement processing and the on-screen display data, and fuses the received video data subjected to enhancement processing with the on-screen display data.

The display drive circuit 140 receives and fuses the video data subjected to enhancement processing and the OSD data. Data fusion is a method of using color information in two digital images to create a composite image. Usually two images are layered together to make a combined image with blending modes. A bottom layer is a base layer, and a top layer is a blending layer. Unique mathematical operation of each of the blending modes should be configured as color information of each pixel in the blending layer, and the color information of each pixel in the blending layer is combined with color information of each corresponding pixel in the base layer to produce the composite image.

S690, the display drive circuit 140 drives the display panel 150 for display according to fused image data.

It should be noted that steps S610 to S650 may be steps implemented when leaving a factory. The steps may also be steps implemented in applications, which are not limited here.

An embodiment of the present disclosure further provides a computer storage medium. The computer-readable storage medium includes a computer program. When the computer program runs on a computer, the computer executes the steps of a control method of a drive control system.

An embodiment of the present disclosure further provides a computer program product containing instructions, including a memory, a processor and a computer program stored in the memory and running on the processor. When the processor executes the program, the steps of a control method of a drive control system are implemented. Those skilled in the art should understand that the embodiments of the present disclosure may be provided as a method, a system or a computer program product. Therefore, the present disclosure may adopt forms of an entirely hardware embodiment, an entirely software embodiment or an embodiment combining software with hardware. Moreover, the present disclosure may adopt a form of a computer program product implemented on one or more computer-usable storage media (including but not limited to a disk memory, an optical memory, etc.) containing computer-usable program codes.

The present disclosure is described with reference to flowcharts and/or block diagrams of the method, the device (system) and the computer program product according to the embodiments of the present disclosure. It should be understood that each process and/or block in the flowcharts and/or block diagrams, and combination of the processes and/or the blocks in the flowcharts and/or block diagrams may be implemented by computer program instructions. These computer program instructions may be provided to processors of a general-purpose computer, a special-purpose computer, an embedded processing machine or other programmable data processing devices to generate a machine, so that instructions executed by the processors of the computers or the other programmable data processing devices generate an apparatus configured to implement functions specified in one process or more processes in the flowcharts and/or one block or more blocks in the block diagrams.

These computer program instructions may also be stored in a computer-readable memory that can direct a computer or other programmable data processing devices to work in a specific manner, so that the instructions stored in the computer-readable memory produce an article of manufacture including an instruction device. The instruction device implements the functions specified in one process or more processes in the flowcharts and/or one block or more blocks in the block diagrams.

These computer program instructions may also be loaded on a computer or other programmable data processing devices, so that a series of operation steps are executed on the computer or the other programmable devices to produce computer-implemented processing, and therefore the instructions executed on the computer or the other programmable devices provide steps configured to implement the functions specified in one process or more processes in the flowcharts and/or one block or more blocks in the block diagrams.

Apparently, those skilled in the art may make various modifications and variations to the present disclosure without departing from the spirit and scope of the present disclosure. In this way, if these modifications and variations of the present disclosure fall within the scope of the claims of the present disclosure and their equivalent technologies, the present disclosure is also intended to include these modifications and variations.

What is claimed is:

1. A drive control system, comprising:
   a system on chip, configured to receive video data and user operation instructions;
   a video data processor, electrically connected with the system on chip and configured to receive the video data sent by the system on chip and perform enhancement processing on the video data;
   an on-screen display data processor, electrically connected with the system on chip and configured to receive the user operation instructions sent by the system on chip and process the user operation instructions into corresponding on-screen display data; and
   a display drive circuit, electrically connected with the video data processor and the on-screen display data processor respectively and configured to receive video data subjected to enhancement processing sent by the video data processor and the on-screen display data and fuse the video data subjected to enhancement processing with the on-screen display data to drive a display panel for display according to fused data;
   wherein the system on chip is further configured to:
      acquire a current resolution of the display panel and a current data architecture of an on-screen display data module in the on-screen display data processor;
      determine whether the current data architecture is matched with a data architecture of the on-screen display data module required by a current resolution or not; and
      send the data architecture of the on-screen display data module required by the current resolution to the on-screen display data processor, in response to determining that the current data architecture is not matched with the data architecture of the on-screen display data module required by the current resolution.

2. The drive control system according to claim 1, wherein the system on chip is further configured to store a plurality of preset data architectures of the on-screen display data module.

3. The drive control system according to claim 1, wherein the system on chip is further configured to:
   acquire a data architecture change instruction sent by a user; and
   generate and store a customized data architecture of the on-screen display data module according to the data architecture change instruction.

4. The drive control system according to claim 1, wherein the data architecture comprises structural parameters of a graphical user interface displayed on the display panel.

5. The drive control system according to claim 1, wherein the system on chip comprises a first system on chip and at least one second system on chip;
   the first system on chip is configured to receive the user operation instructions; and
   the first system on chip and each second system on chip are configured to receive the video data respectively.

6. The drive control system according to claim 1, wherein the drive control system further comprises:
   a bypass signal receiving circuit, electrically connected with the video data processor and configured to receive a bypass video signal and send the bypass video signal to the video data processor;

the video data processor is further configured to receive the bypass video signal and perform enhancement processing on the bypass video signal; and the display drive circuit is further configured to receive bypass video data subjected to enhancement processing sent by the video data processor.

7. A control method of the drive control system according to claim 1, wherein the control method comprises:

receiving, by the system on chip, video data and user operation instructions;

sending, by the system on chip, the video data to the video data processor to trigger the video data processor to receive the video data and perform enhancement processing on the video data, and sending, by the system on chip, the user operation instructions to the on-screen display data processor to trigger the on-screen display data processor to receive the user operation instructions and process the user operation instructions into corresponding on-screen display data;

receiving, by the display drive circuit, video data subjected to enhancement processing and the on-screen display data and fusing, by the display drive circuit, the video data subjected to enhancement processing with the on-screen display data; and driving, by the display drive circuit, the display panel for display according to fused data.

8. The control method according to claim 7, wherein before receiving, by the system on chip, the video data and the user operation instructions, the control method further comprises:

acquiring, by the system on chip, a current resolution of the display panel and a current data architecture of an on-screen display data module in the on-screen display data processor;

determining whether the current data architecture is matched with a data architecture of the on-screen display data module required by a current resolution or not; and sending the data architecture of the on-screen display data module required by the current resolution to the on-screen display data processor, in response to determining that the current data architecture is not matched with the data architecture of the on-screen display data module required by the current resolution.

9. The control method according to claim 8, wherein before receiving, by the system on chip, the video data and the user operation instructions, the control method further comprises:

storing a plurality of preset data architectures of the on-screen display data module.

10. The control method according to claim 8, wherein before receiving, by the system on chip, the video data and the user operation instructions, the control method further comprises:

acquiring a data architecture change instruction sent by a user; and generating and storing a customized data architecture of the on-screen display data module according to the data architecture change instruction.

11. A non-transitory computer-readable storage medium, having a computer program stored thereon, wherein when the program is executed by a processor, the steps of the control method of the drive control system according to claim 7 are implemented.

12. The drive control system according to claim 2, wherein the data architecture comprises structural parameters of a graphical user interface displayed on the display panel.

13. The drive control system according to claim 2, wherein the system on chip comprises a first system on chip and at least one second system on chip;

the first system on chip is configured to receive the user operation instructions; and the first system on chip and each second system on chip are configured to receive the video data respectively.

14. The drive control system according to claim 2, wherein the drive control system further comprises:

a bypass signal receiving circuit, electrically connected with the video data processor and configured to receive a bypass video signal and send the bypass video signal to the video data processor;

the video data processor is further configured to receive the bypass video signal and perform enhancement processing on the bypass video signal; and the display drive circuit is further configured to receive bypass video data subjected to enhancement processing sent by the video data processor.

15. The drive control system according to claim 3, wherein the data architecture comprises structural parameters of a graphical user interface displayed on the display panel.

16. The drive control system according to claim 3, wherein the system on chip comprises a first system on chip and at least one second system on chip;

the first system on chip is configured to receive the user operation instructions; and the first system on chip and each second system on chip are configured to receive the video data respectively.

17. The drive control system according to claim 3, wherein the drive control system further comprises:

a bypass signal receiving circuit, electrically connected with the video data processor and configured to receive a bypass video signal and send the bypass video signal to the video data processor;

the video data processor is further configured to receive the bypass video signal and perform enhancement processing on the bypass video signal; and the display drive circuit is further configured to receive bypass video data subjected to enhancement processing sent by the video data processor.

* * * * *